April 20, 1965 J. R. BENFORD 3,179,007
SLIDE PROJECTOR WITH RADIATION PRE-HEATING OF SLIDES
Filed March 9, 1962
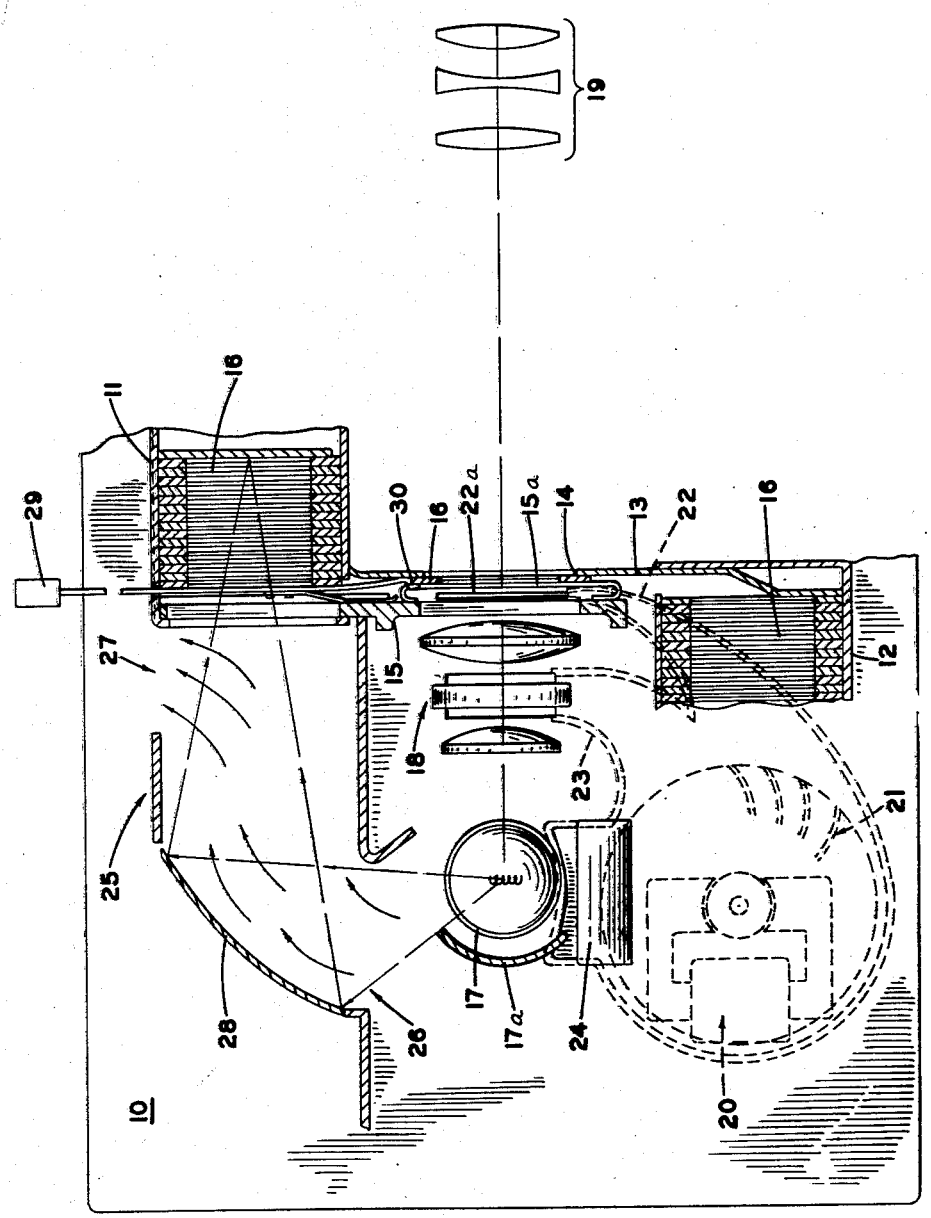
INVENTOR.
JAMES R. BENFORD
BY Frank C. Parker
ATTORNEY

3,179,007
SLIDE PROJECTOR WITH RADIATION PRE-HEATING OF SLIDES
James R. Benford, Irondequoit, N.Y., assignor to Bausch & Lomb Incorporated, Rochester, N.Y., a corporation of New York
Filed Mar. 9, 1962, Ser. No. 178,624
4 Claims. (Cl. 88—28)

The present invention relates generally to photographic film slide projectors and more particularly to such projectors having a slide-containing magazine mounted thereon for storage and sequential projection of a stack of slides.

In photographic film slide projectors, as is well known, the projection lamp generates a large amount of heat. This presents numerous problems in order to properly dissipate the heat so as not to damage the projector or the slides being projected thereby. It has long been known that the heat generated by the projection lamp is sufficient to cause the slides, after they are moved into projection position, to buckle or pop and thus make it necessary to repeatedly change the focus in order to retain the image in clear condition on the screen.

In order to overcome the annoying re-focusing problem presented by the buckling or popping of the slide transparencies while in the film gate or in projection position, it has been proposed to utilize a fan for blowing large quantities of air past the projection lamp so as to dissipate the heat in this fashion. This has not proved to be effective due to the fact that radiation from the lamp, even when filtered to remove all infra-red radiation, is still sufficient to buckle or pop the film disposed in projection position.

It has also been proposed to direct a quantity or portion of the air heated by the projection lamp onto the slides or a limited number thereof immediately prior to movement of the slides successively into projection position. This pre-buckles the slides so that they are stabilized and do not buckle out of focus during projection. This has proved to be more satisfactory than the attempts to completely dissipate the heat from the film in the projection gate by convection cooling. However, in slide projectors utilizing a magazine wherein a stack of slides is disposed in the magazine with each adjacent slide touching the next, it is substantially impossible to direct a sufficient quantity of heated air onto any of the slides in the stack except for the ones at either end to effect reliable pre-buckling during normal sequential projection.

The present invention comprises a slide projector utilizing means for gathering, converging and directing radiation or radiant flux from the projection lamp onto a number of slides in the slide storage magazine whereby such slides are heated by radiation in order to effect pre-popping or buckling of the slides prior to movement thereof into projection position. Since the slides are reasonably transparent, radiant energy penetrates the stack of slides, in a manner substantially impossible for convection heating, thereby effecting pre-popping of a number of slides at one time. A further feature of the present invention resides in the provision of an air passage for directing a portion of the air which is blown past the projection lamp toward the slide next to be moved into projection position. Thus each slide is pre-heated by the combined effects of convection and radiation and pre-popping or buckling of the slides prior to movement thereof into projection position is substantially assured.

With the foregoing general concepts in mind the invention will now be described in detail with reference to the accompanying drawing which illustrates schematically a slide projector constructed in accordance with the provisions of the present invention.

With reference now to the drawing, the slide projector depicted therein comprises a base 10 having a slide storage magazine 11 and a slide receiving magazine 12 mounted thereon. An upright member 13 having an opening or aperture 14 therein forming a film gate extends between the magazines 11 and 12. A second member 15 also extends between magazines 11 and 12 such that films or slides 16 may be advanced between members 13 and 15. A pair of spring strips 15a disposed adjacent the top and bottom of the slide 16 holds the slide against member 13.

In optical alignment with the aperture 14 are mounted a projection lamp 17, reflector 17a, a condensing lens assembly 18 and a projection lens assembly 19.

Beneath the base 10 is mounted a motor 20 which drives a fan 21 for supplying a source of air primarily for cooling the projection lamp 17. The fan 21 is mounted within a suitable housing formed with duct-like passages 22, 23 and 24. The passage terminates in an elongate opening 22a and conveys a limited quantity of cooling air to the film gate or aperture 14 in order to cool the slide sufficiently to prevent the film 16 disposed in projection position from overheating. The duct 23 conveys a quantity of cooling air to the condenser lens assembly 18 in order to effect cooling thereof. The duct-like passage 24 directs cooling air past the lamp 17 and most of this air escapes through the top of the projector (not shown). Such duct-like flow of air through projectors is well known.

The projector also includes a housing member 25 formed with an opening 26 and with a second opening 27. A mirror-like reflector 28 is mounted within the housing portion 25 and is effective to gather radiation or radiant flux from the projection lamp 17, converge such radiation and direct it toward a plurality of slides 16 received within slide storage magazine 11. Consequently several of the leftward most slides 16 in magazine 11 are heated by radiation. A portion of the air heated by the lamp 17 passes through opening 26 and is directed by the mirror 28 toward the leftward most slide 16 in magazine 11. Thus each of the slides 16 in the magazine 11 is pre-heated by the combined action of radiation and convection prior to its being moved by a slide moving lever 29 from its position at the leftward end of magazine 11 into projection position opposite aperture 14.

In the operation of the present slide projector it is contemplated that the slide transfer or moving lever 29 will move a slide 16 from magazine 11 into projection position opposite aperture 14 and after the image of such slide has been projected, continued downward movement of lever 29 will move the slide 16 into the slide receiving magazine 12. The lever 29 may then be completely retracted until the leading end 30 thereof engages the upper edge of the next most leftward slide in magazine 11 in order to advance such slide into projection position.

It has been found that slide projectors utilizing radiation from the projection lamp in order to pre-heat the slides by radiation are particularly effective for causing pre-popping or buckling of the slides prior to movement thereof into projection position. By utilizing the portion of air which has been heated by the projection lamp 17 to further or additionally heat the slide just prior to its being moved into projection position, a still more effective pre-heating of the slides is provided.

It is contemplated that changes and modifications may be made in the present invention without departing from the spirit or scope thereof. In particular it is contemplated that the present invention will be applicable to slide projectors utilizing automatic slide changing means as well as slide changers of a type similar to the manual type disclosed herein.

What is claimed is:

1. In a photographic film slide projector, a magazine mounted on said projector for receiving a plurality of slides, means on the projector defining a projection aperture, slide handling means for moving a slide from said magazine to projection position at said aperture, a projection lamp and lens assembly aligned with said aperture for projecting an image of the slide in projection position, and radiation collecting means for gathering, converging and directing radiation from said projection lamp and incident on said radiation collecting means onto the slides contained in said magazine to pre-heat the slides prior to movemet thereof into said projection position.

2. In a photographic film slide projector, a magazine mounted on said projector for receiving a plurality of slides, means on the projector defining a projection aperture, slide handling means for moving a slide from said magazine to projection position at said aperture, a projection lamp and lens assembly aligned with said aperture for projecting an image of the slide in projection position, and a radiation collecting mirror for gathering, converging and directing radiation from said projection lamp and incident on said mirror onto the slides contained in said magazine to pre-heat the slides prior to movement thereof into said projection position.

3. In a photographic film slide projector, a magazine mounted on said projector for receiving a plurality of slides, means for moving a slide from said magazine to a projection position, a projection lamp, means for moving air past the lamp to cool the same, a passage for directing air heated by the lamp toward said slides, and radiation collecting means for directing radiation from said projection lamp and incident on said radiation collecting means onto said slides contained in said magazine whereby said slides are pre-heated by a combination of said radiation and the heated air prior to movement of the slides into the projection position.

4. In a photographic film slide projector, a magazine mounted on said projector for receiving a plurality of slides, means for moving a slide from said magazine to a projection position, a projection lamp, means for moving air past the lamp to cool the same, and a reflecting mirror for directing radiation from said lamp and incident thereon onto said slides contained in said magazine, said reflecting mirror acting as an air scoop to direct air passing over said lamp toward said slides contained in said magazine, whereby said slides are pre-heated by the combination of said radiation and the heated air prior to movement of the slides into the projection position.

References Cited by the Examiner
UNITED STATES PATENTS

| | | | |
|---|---|---|---|
| 2,023,065 | 12/35 | Conrad et al. | 88—24 X |
| 2,933,979 | 4/60 | Lacoe | 88—28 |
| 2,949,815 | 8/60 | Rosenberger et al. | 88—28 |

NORTON ANSHER, *Primary Examiner.*

WILLIAM MISIEK, *Examiner.*